US009935546B2

(12) United States Patent
Jatavallabhula et al.

(10) Patent No.: US 9,935,546 B2
(45) Date of Patent: Apr. 3, 2018

(54) SWITCHING-MODE POWER SUPPLY WITH HELPER CURRENT SOURCE

(71) Applicant: QUALCOMM Incorporated, San Diego, CA (US)

(72) Inventors: Srikanth Jatavallabhula, Bangalore (IN); Anand Kudari, Bangalore (IN); Arvindh Rajasekaran, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/012,619

(22) Filed: Feb. 1, 2016

(65) Prior Publication Data

US 2017/0222554 A1    Aug. 3, 2017

(51) Int. Cl.
  *G05F 1/00* (2006.01)
  *H02M 3/158* (2006.01)
  *H02M 1/00* (2006.01)

(52) U.S. Cl.
  CPC ...... *H02M 3/158* (2013.01); *H02M 2001/008* (2013.01); *H02M 2001/0009* (2013.01); *H02M 2001/0045* (2013.01)

(58) Field of Classification Search
  CPC ........ G05F 1/613; G05F 1/618; H02M 3/145; H02M 3/155; H02M 3/156; H02M 3/158; H02M 3/1588; H02M 3/1582; H02M 2001/0045; H02M 2001/0067; H01H 2300/018
  See application file for complete search history.

(56) References Cited

U.S. PATENT DOCUMENTS

| 5,422,562 | A | 6/1995 | Mammano et al. |
| 8,054,058 | B2 | 11/2011 | Liu et al. |
| 8,587,268 | B1 | 11/2013 | Huard |
| 8,994,347 | B2 | 3/2015 | Galbis et al. |
| 2012/0139514 | A1 | 6/2012 | Paatero |
| 2013/0099573 | A1* | 4/2013 | Nakajima ............... H02J 1/108 307/64 |
| 2014/0167710 | A1* | 6/2014 | Ingino, Jr. ................. G05F 3/08 323/223 |

FOREIGN PATENT DOCUMENTS

EP    1143591 A2    10/2001

OTHER PUBLICATIONS

International Search Report and Written Opinion—PCT/US2016/066308—ISA/EPO—dated Mar. 8, 2017.

* cited by examiner

*Primary Examiner* — Adolf Berhane
*Assistant Examiner* — Afework Demisse
(74) *Attorney, Agent, or Firm* — Procopio, Cory, Hargreaves & Savitch LLP (57) ABSTRACT

Power supplies combining a switching-mode power supply in parallel with a current source can improve maximum load current capability. The current source can be turned on, or the amount of current supplied by the current source increased, when there is a heavy load current demand, for example, when the load current demand is more than the current rating of the switching-mode power supply. The duty cycle of the output stage of the switching-mode power supply can be used to determine the load current demand. The current source may increase the maximum output current of the power supply beyond the maximum output current of the switching-mode power supply. For example, the current source may add 0.5 A to the current capability of a 2.5 A switching-mode power supply.

26 Claims, 7 Drawing Sheets

SWITCHING-MODE POWER SUPPLY WITH HELPER CURRENT SOURCE

BACKGROUND

Field

The present invention relates to electronic power supplies and, more particularly, to switching-mode power supplies with helper current sources.

Background

Many functions of an advanced electronic system, such as a mobile phone, are implemented in a system-on-a-chip (SoC) integrated circuit. The SoC may use several power supplies. The power supplies are generally provided by switching-mode power supplies. The amount of load current for each power supply may be difficult to accurately predict during development of the system. A power supply for the system may designed concurrently with design of the SoC. Inaccuracies in the expected load currents make design of a power supply for the system difficult. If the capability of the power supply is not adequate for the SoC, the system may need to additional expensive components or the power supply may need to be redesigned. Thus, the power supply may be designed to supply currents that are increased by guard-band amounts to allow for inaccuracies in the predicted current loads.

Some prior systems have addressed maximum load current uncertainty by oversizing the switching-mode power supply to provide for any plausible load current. This can increase manufacturing cost, device size, and development cost. Other prior systems have included a helper linear voltage regulator in parallel with the switching-mode power supply to increase the maximum current capability. This can cause performance issues and in such systems it may not be possible to provide dynamically programmable supply voltage.

SUMMARY

In one aspect, a power supply is provided that includes: a first switching-mode power supply configured to supply current to a first supply output; a second switching-mode power supply configured to supply current to a second supply output; a current source configurable to supply current to the first supply output or the second supply output; and a control circuit configured to control the current supplied by the current source based, in the case that the current source is configured to supply current to the first supply output, on a measurement of the current supplied by the first switching-mode power supply or based, in the case that the current source is configured to supply current to the second supply output, on a measurement of the current supplied by the second switching-mode power supply.

In one aspect, a power supply is provided that includes: a supply input; a supply output; a switching-mode power supply configured to supply current to the supply output; a current source configured to supply current to the supply output from the supply input; and a control circuit configured to control the current supplied by the current source based on a duty cycle of an output stage of the switching-mode power supply.

In one aspect, a method is provided for supplying current to a load. The method includes: supplying current from a switching-mode power supply to the load; determining a duty cycle of an output stage of the switching-mode power supply; and supplying current from a current source to the load, wherein the current supplied by the current source is based on the determined duty cycle.

In one aspect, a power supply is provided that includes: a switching-mode power supply for supplying current to a supply output from a supply input; a current source for supplying current to the supply output from the supply input; and a control means for controlling an amount of current supplied by the current source based on a duty cycle of an output stage of the switching-mode power supply.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in simplified form in order to avoid obscuring such concepts.

Figure 1:
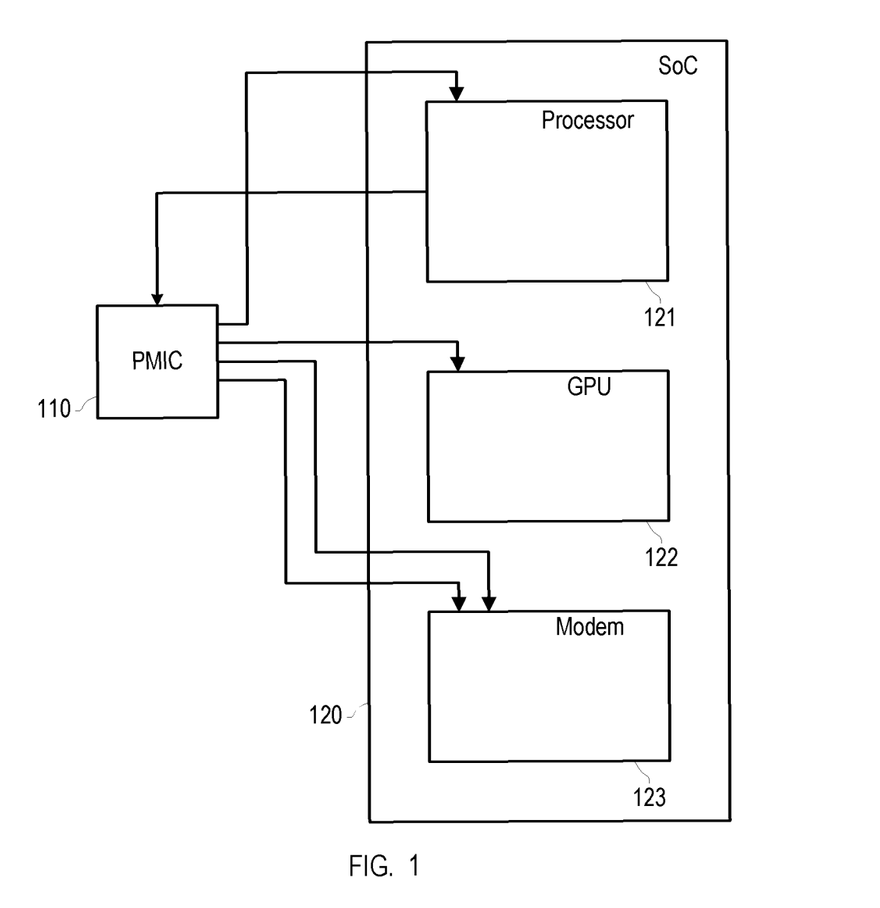
FIG. 1 is a functional block diagram of an electronic system according to a presently disclosed embodiment.

FIG. 1 is a functional block diagram of an electronic system. The system may be implemented, for example, using one or multiple integrated circuits. The system may be used, for example, in a mobile phone.

The system includes various modules that perform operational functions for the system. The term operational is used to distinguish functions that may be considered to provide the primary utility of the electronic system from those functions that may be considered ancillary. The example system illustrated in FIG. 1 includes a processor 121, a graphics processing unit (GPU) 122, and a modem 123. The processor 121 can provide general programmable functions; the graphics processing unit 122 can provide graphics functions; and the modem 140 can provide communications functions, for example, wireless communications according to long term evolution (LTE) or code division multiple access (CDMA) protocols. The processor 121, the graphics processing unit 122, and the modem 123 are in a system-on-a-chip (SoC) integrated circuit 120.

A power management integrated circuit (PMIC) 110 supplies one or more voltages to other modules in the system. The PMIC 110 may include switching-mode power supplies and low-dropout regulators. The switching-mode power supplies may, for example, be buck converters. The PMIC 110 may include one or more helper current sources connected in parallel with one or more of the switching voltage regulators.

The PMIC 110 may be a separate integrated circuit, fabricated, for example, using a complementary metal-oxide-semiconductor (CMOS) process. The voltages supplied by the PMIC 110 are controlled by signals from the processor 121. Modules of the systems may have one power supply or power voltages supplies and multiple modules may operate with a common power supply. Circuitry operating from a particular power supply may be referred to as a supply domain. The voltages supplied by the PMIC 110 may be dynamically controlled, for example, based on operating modes of the system. The operating modes may include clock frequencies of the modules. Dynamic control of the voltages supplied by the PMIC 110 may include increasing a voltage in an operating mode with a higher clock frequency and decreasing the voltage in an operating mode with a lower clock frequency.

Figure 2:
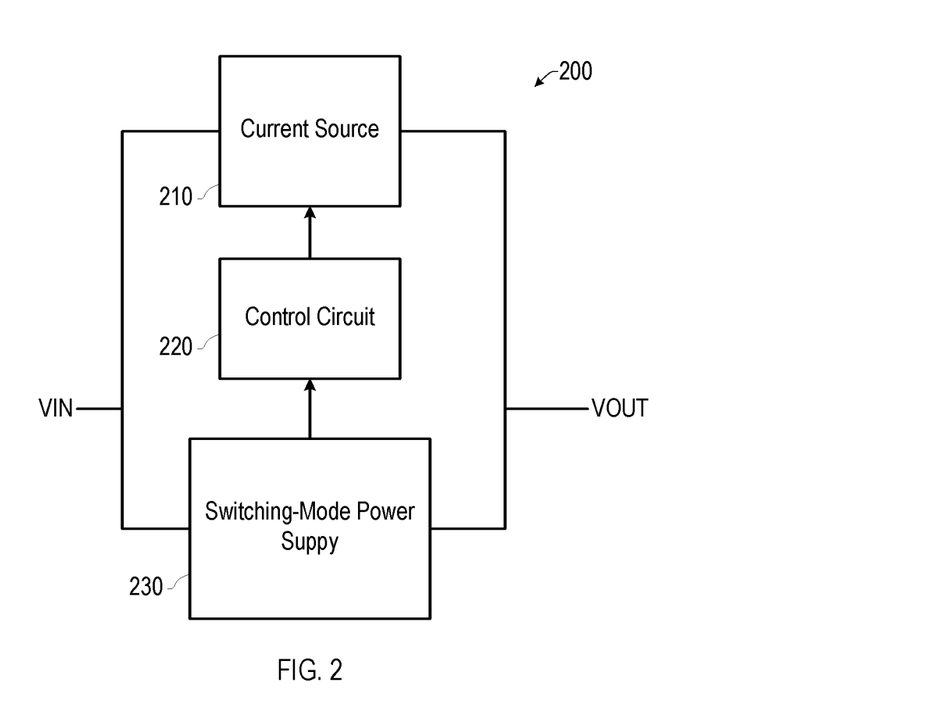
FIG. 2 is a functional block diagram of a power supply including a switching-mode power supply coupled in parallel with a helper current source according to a presently disclosed embodiment.

FIG. 2 is a functional block diagram of a power supply 200 including a switching-mode power supply (SMPS) 230 coupled in parallel with a helper current source 210 according to a presently disclosed embodiment. The power supply may be implemented, for example, using the power management integrated circuit 110 in the system of FIG. 1.

The power supply 200 of FIG. 2 includes the switching-mode power supply 230 that supplies current to a supply output (VOUT) from a supply input (VIN). The supply output may be connected to one or more loads, for example, the processor 121, the graphics processing unit 122, or the modem 123 of the system of FIG. 1. The supply input may be connected to an energy source, for example, a battery. The switching-mode power supply 230 is able to supply current to the supply output with high power efficiency. However, the switching-mode power supply 230 may be relatively costly to develop and manufacture.

The power supply 200 includes the current source 210 that can also supply current to the supply output (VOUT) from the supply input (VIN). The current source 210 may be economical to develop and manufacture. However, the current source 210 may supply current with relatively low power efficiency. The current source 210 may be implemented on the same integrated circuit used to implement the switching-mode power supply 230.

The power supply 200 includes a control circuit 220 that controls the current source 210. The control circuit 220 may turn on the current source 210 or adjust the amount of current the current source 210 provides when current provided by the switching-mode power supply 230 is at or near (e.g., within a few percent) its maximum output current. In this way, the current source 210 can help the switching-mode power supply 230 supply increased current to the supply output. Thus, the current source 210 may be referred to as a helper current source. The current provided by the switching-mode power supply 230 may be measured directly or indirectly, for example, based on a duty-cycle of a pulse-width modulation (PWM) generator of the switching-mode power supply 230.

The switching-mode power supply 230 has a low output impedance, for example, 100 milliohms. The current source 210 has a high output impedance compared to the output impedance of the switching-mode power supply 230. This facilitates directly connecting the output of the switching-mode power supply 230 and the output of the current source 210. This also facilitates dynamically controlling the voltage output from the switching-mode power supply 230 without adverse interactions with the current source 210. Similarly, the current output from the current source 210 can be dynamically controlled without adverse interactions with the switching-mode power supply 230.

The ease of direct connection of outputs in the power supply 200 of FIG. 2 is in contrast to prior power supplies that connect the outputs of a switching-mode power supply and a linear voltage regulator (e.g., a low-dropout (LDO) voltage regulator), which also has a low output impedance. Achieving stability in such prior power supplies may by complex, and it may not be practical to provide a dynamically programmable output voltage.

The switching-mode power supply 230 may include pairs of switch transistors for driving the output. Accordingly, the switch transistors may be referred to as an output stage. The switch transistors can occupy large integrated circuit area and, thus, can be costly to manufacture. The integrated circuit area of the switch transistors is generally proportional to the maximum output current (which may be referred to as "current rating" or, in the case of a buck converter, "buck rating") of the switching-mode power supply 230. The integrated circuit area per unit of current for a current source may be about 40% less than for a switching-mode power supply. Thus, it is advantageous to substitute current source capability for switching-mode power supply capability to provide a guard-band current capability. In various embodiments, the current supplied by the current source 210 may be 10% to 30% of the maximum output current of the switching-mode power supply 230. For example, the current source may add 0.5 A to the current capability of a 2.5 A switching-mode power supply.

Figure 3:
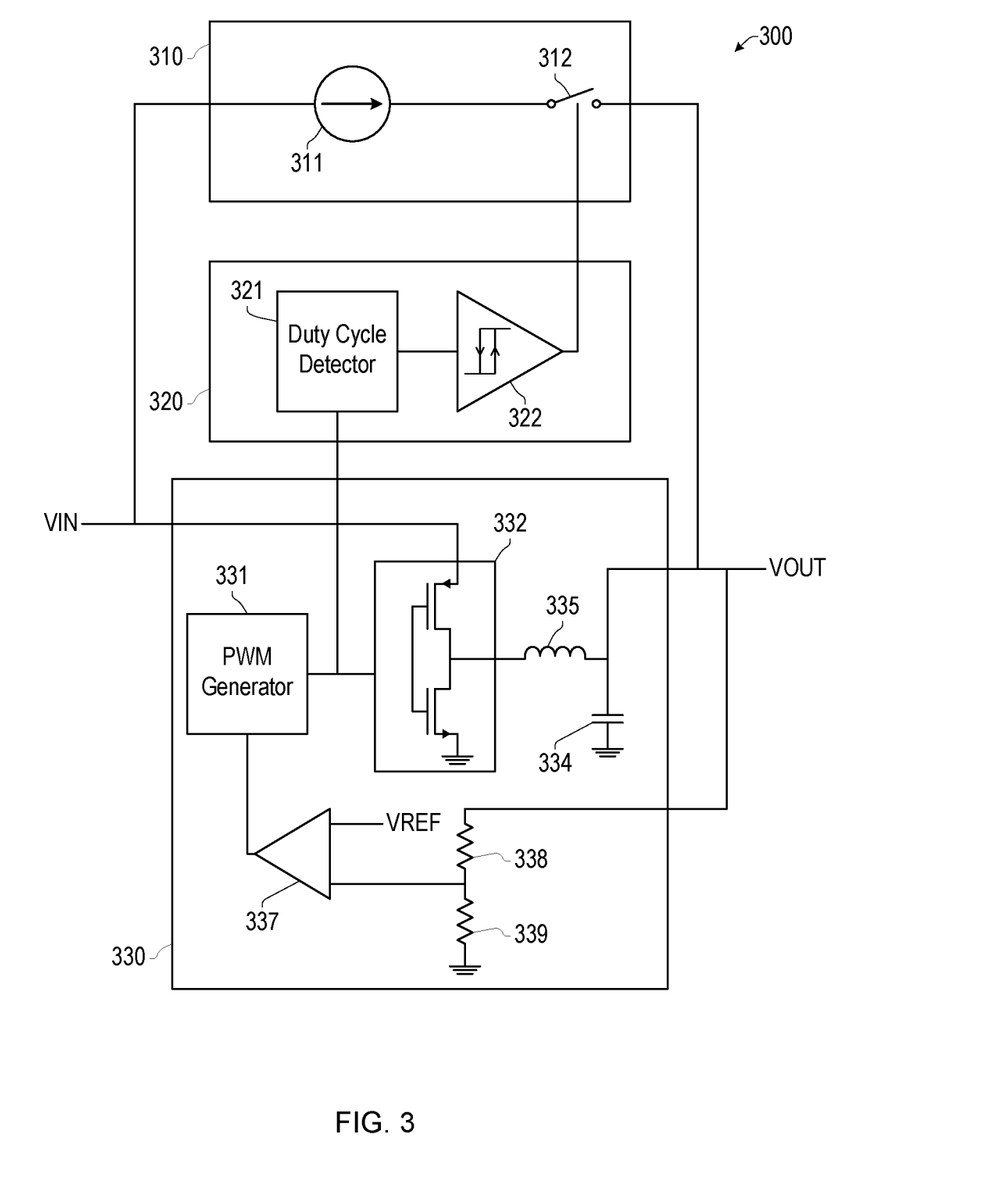
FIG. 3 illustrates a power supply including a switching-mode power supply coupled in parallel with a helper current source using a first control method according to a presently disclosed embodiment.

FIG. 3 illustrates a power supply 300 including a switching-mode power supply 330 (implemented as a buck converter) coupled in parallel with a helper current source 310 with a control circuit 320 providing a first control method according to a presently disclosed embodiment. The power supply 300 may be implemented, for example, in the power management integrated circuit 110 in the system of FIG. 1.

The switching-mode power supply 330 includes a pulse-width modulation generator 331 that controls switch transistors 332. The switch transistors 332 are coupled to the supply output (VOUT) via an inductor 335. The switch transistors 332 alternate between switching the inductor 335 to the supply input (VIN) and to a ground reference. The pulse-width modulation generator 331 controls how long in each control cycle the switch transistors 332 couple the inductor 335 to the supply input versus to the ground reference. The percentage of a control cycle during which the switch transistors 332 couple the inductor 335 to the supply input is referred to as the duty cycle of the switching-mode power supply 330. As the duty cycle increases, the current supplied by the switching-mode power supply 330 increases. Beyond some maximum duty cycle (e.g., 80%), the switching-mode power supply 330 may not operate properly. This maximum duty cycle (e.g., 80%) corresponds to the maximum output current of the switching-mode power supply 330.

The pulse-width modulation generator 331 receives feedback from an error amplifier 337 to regulate the voltage on the supply output by controlling the duty cycle. The error amplifier 337 can amplify a difference between a reference voltage (VREF) and a scaled version of the supply output. A voltage divider provided by resistor 338 and resistor 339 provides the scaled version of the supply output. For example, when the reference voltage is 1.25 V and the desired output voltage is 2.5 V the voltage divider can scale the supply output by one half. The switching-mode power supply 330 also includes an output capacitor 334 to reduce voltage ripples on the supply output.

The control circuit 320 detects the duty cycle of the switch transistors 332 of the switching-mode power supply 330 using a duty-cycle detector 321. The duty cycle provides a measurement of the current supplied by the switching-mode power supply 330. The duty-cycle detector 321 may detect the duty cycle by low-pass filtering a control signal that also controls the switch transistors 332. Alternatively, the duty-cycle detector 321 may receive a digital value from the pulse-width modulation generator 331 that indicates the duty cycle.

A comparator 322 compares the detected duty cycle to one or more thresholds. The helper current source 310 is enabled based on the results of the comparison. As illustrated in FIG. 3, the comparator 322 may be a hysteretic comparator and compare the duty cycle to two thresholds. When the duty cycle is greater than a first threshold (e.g., 75%), the control circuit 320 turns on the helper current source 310. When the duty cycle is less than a second threshold, which is less than the first threshold, (e.g., 70%), the control circuit 320 turns off the helper current source 310. When the duty cycle is between the first threshold and the second threshold, the control circuit 320 leaves the helper current source in its prior (on or off) state. Hysteresis in the control avoids repeated switching on and off of the helper current source 310 thereby avoiding transients on the supply output.

FIG. 3 illustrates turning on/off (or enabling/disabling) the helper current source 310 provided by a switch 312 in series with a current source 311. Accordingly, turning on the helper current source may be referred to as connecting the helper current source. Other techniques may be used to enable and disable the helper current source 310. For example, a current source connected to the supply output may be turned on and off. In an embodiment, a reference current supplied to a current mirror in the current source may be turned on and off to turn the helper current source on and off. The current from the helper current source 310 may ramp up and down over several microseconds.

Figure 4:
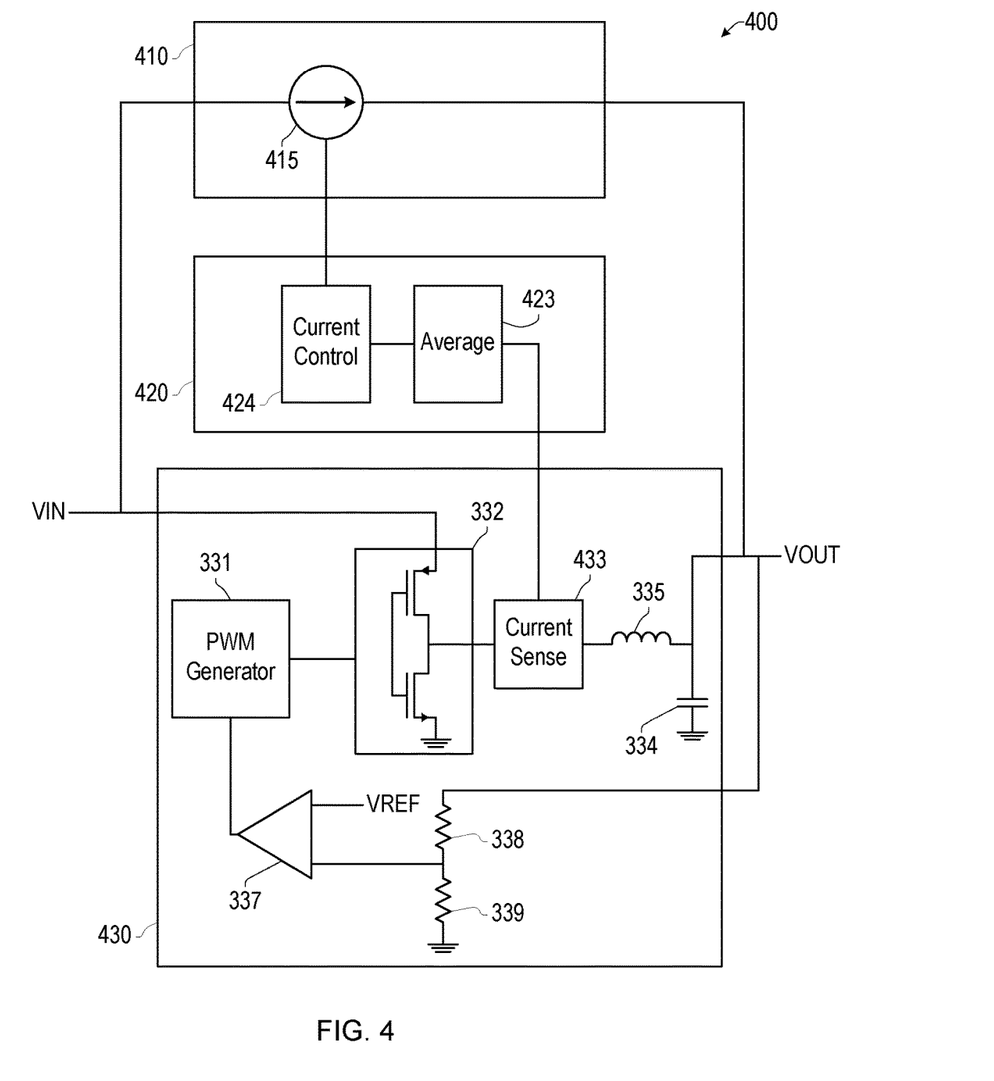
FIG. 4 illustrates a power supply including a switching-mode power supply coupled in parallel with a helper current source using a second control method according to a presently disclosed embodiment.

FIG. 4 illustrates a power supply 400 including a switching-mode power supply 430 (implemented as a buck converter) coupled in parallel with a helper current source 410 with a control circuit 420 providing a second control method according to a presently disclosed embodiment. The power supply 400 may be implemented, for example, in the power management integrated circuit 110 in the system of FIG. 1. The power supply 400 of FIG. 4 is similar to the power supply 300 of FIG. 3 with like named elements operating in like fashion except for described differences.

The switching-mode power supply 430 includes a current sensor 433 that senses current in the inductor 335. The current sensor 433 may, for example, sense current in the inductor based on the voltage across a resistor coupled in series with the inductor 335. Other current sensing methods may also be used. For example, the current sensor 433 may derive the inductor current from voltages on the switch transistors 332. Switching-mode power supply 430 provides an indication of the sensed inductor current (e.g., a voltage proportional to the current) to the control circuit 420.

The control circuit 420 uses the sensed inductor current to control the helper current source 410. An averaging module 423 (or averager) receives and time averages the indication of the inductor current. The average inductor current provides a measurement of the current supplied by the switching-mode power supply 430. For example, the averaging module 423 may use a resistor-capacitor low-pass filter to average the inductor current. The averaged inductor current is essentially equivalent to the averaged load current. Accordingly, control of the helper current source 410 by the control circuit 420 may also be viewed as being based on load current.

The control circuit 420 includes a current controller 424 that controls the helper current source 410 based on the averaged inductor current. The current controller 424 can control the helper current source 410 to supply a current proportional to the averaged measured inductor current. Proportional control of the helper current may avoid transients on the output of the power supply 400 that could be caused by large, rapid changes in the helper current. The control circuit 420 may, for example, convert the averaged inductor current to a current to control the amount of current sourced by the helper current source 410.

The helper current source 410 includes a current source 415 that is controlled by the control circuit 420. The current source 415 may include a current mirror that scales (e.g., by a factor of 500) a current from the control circuit 420 and supplies the scaled current to the supply output.

Many control circuit techniques beyond those illustrated in FIGS. 3 and 4 may be used including different combinations of features from the disclosed embodiments. For example, a duty cycle measurement may be substituted for an inductor current measurement in a control circuit, and vice versa. Additionally, the magnitude of the helper current may be proportional to the switching-mode power supply current if the switching-mode power supply current exceeds a threshold and substantially zero (e.g., leakage current from an off current source) if the switching-mode power supply current is less than the threshold. In an embodiment, the helper current may be varied in steps based on the inductor current.

Figure 5:
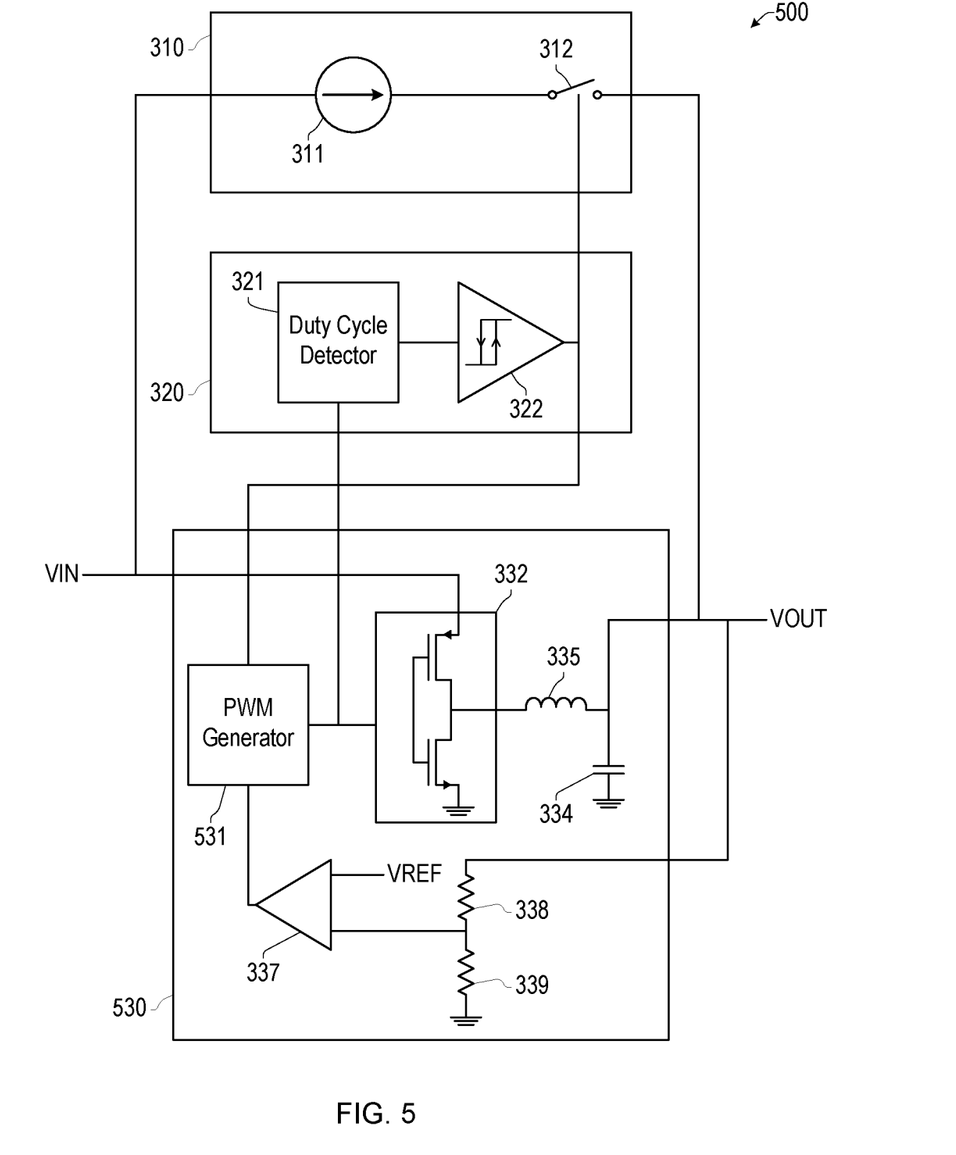
FIG. 5 illustrates a power supply including a switching-mode power supply (implemented as a buck converter) coupled in parallel with a helper current source including transient suppression according to a presently disclosed embodiment.

FIG. 5 illustrates a power supply 500 including a switching-mode power supply (implemented as a buck converter) 530 coupled in parallel with a helper current source 310 including transient suppression according to a presently disclosed embodiment. The power supply 500 may be implemented, for example, in the power management integrated circuit (PMIC) 110 in the system of FIG. 1. The power supply 500 of FIG. 5 is similar to the power supply 300 of FIG. 3 with like named elements operating in like fashion except for described differences.

When the helper current source 310 is turned on or off by the control circuit 320, the sudden change in effective load on the switching-mode power supply 530 may cause a transient on the supply output. The control circuit 320 signals the pulse-width modulation generator 531 in the switching-mode power supply 530 when the helper current source 310 is turned on or off. The pulse-width modulation generator 531 can then adjust its control of switch transistors 332 to avoid transients. For example, the pulse-width modulation generator 531 can lower the duty cycle when the helper current source 310 is turned on and raise the duty cycle when the helper current source 310 is turned off. The amount change in duty cycle can be selected based on the amount of current supplied by the helper current source 310. In an embodiment, a current feedback used by the pulse-width modulation generator 531 can modified based on the amount of the helper current provided by helper current source 310.

Figure 6:
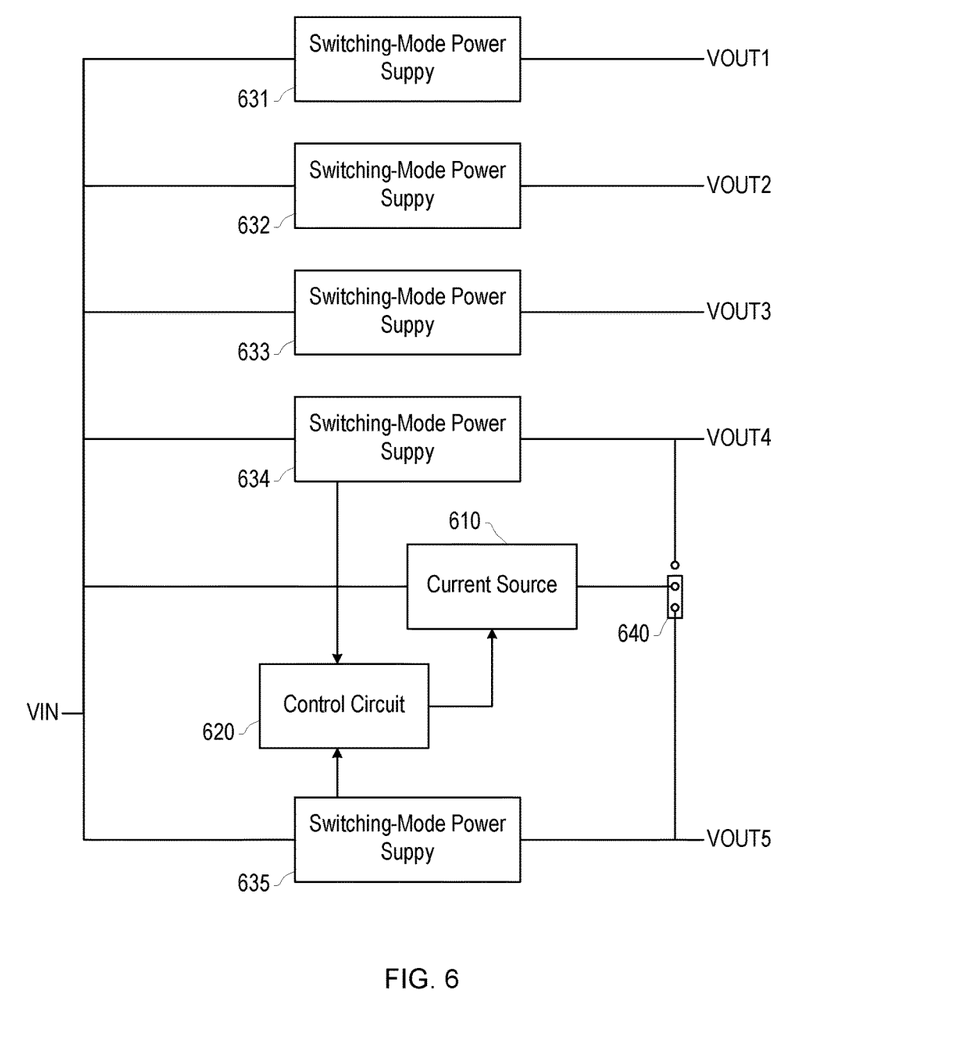
FIG. 6 is a functional block diagram of a power management integrated circuit (PMIC) including multiple switching-mode power supplies (implemented as buck converters) and a sharable helper current source according to a presently disclosed embodiment.

FIG. 6 is a functional block diagram of a power management integrated circuit (PMIC) including multiple switching-mode power supplies (implemented as buck converters) 631-635 and a sharable helper current source 610 according to a presently disclosed embodiment. The power management integrated circuit of FIG. 6 may be used to implement, for example, the power management integrated circuit 110 in the system of FIG. 1.

The PMIC includes five switching-mode power supplies 631-635 and one helper current source 610. The PMIC may be used, for example, in a smartphone that uses five separate power supplies. When other integrated circuits for the smartphone are being developed concurrently with the PMIC, the load currents on some of the power supplies may not be reliably known. The helper current source 610 is arranged to help a configurable one of the switching-mode power supplies. This avoids oversizing multiple ones of the switching-mode power supplies or including multiple helper current sources.

The helper current source 610 of FIG. 6 can be configured to supply current to a load connected to the output of the fourth switching-mode power supply 634 or to a load connected the output of the fifth switching-mode power supply 635. Which load the helper current source 610 supplies current to may be configured by connecting the output of the helper current source 610 to the output of the corresponding one of the fourth switching-mode power supply 634 or the fifth switching-mode power supply 635. The connection may be provided, for example, by board-level connections. In the embodiment illustrated in FIG. 6, a jumper 640 can connect the output of the helper current source 610 to the output of the fourth switching-mode power supply 634 or the output of the fifth switching-mode power supply 635. Alternatively, wiring traces may be added or omitted to configure switching-mode power supply is helped by which the helper current source 610.

A control circuit 620 controls the helper current source 610. The control circuit 620 may be the same as or similar to the control circuit 220, the control circuit 320, or the control circuit 420. In the case that the helper current source 610 is configured to help the fourth switching-mode power supply 634, the control circuit 620 bases its control on measurements of the current supplied by the fourth switching-mode power supply 634. Similarly, in the case that the helper current source 610 is configured to help the fifth switching-mode power supply 635, the control circuit 620 bases its control on measurements of the current supplied by the fifth switching-mode power supply 635. Connections between the control circuit 620 and the configured one of the fourth switching-mode power supply 634 or the fifth switching-mode power supply 635 may be switched internal to the PMIC, for example, using a programmable control register. Thus, which if any of the switching-mode power supplies 631-635 is assisted by the helper current source 610 can be determined after the PMIC and other integrated circuits in the system are developed, for example, during testing and evaluation of the system.

Figure 7:
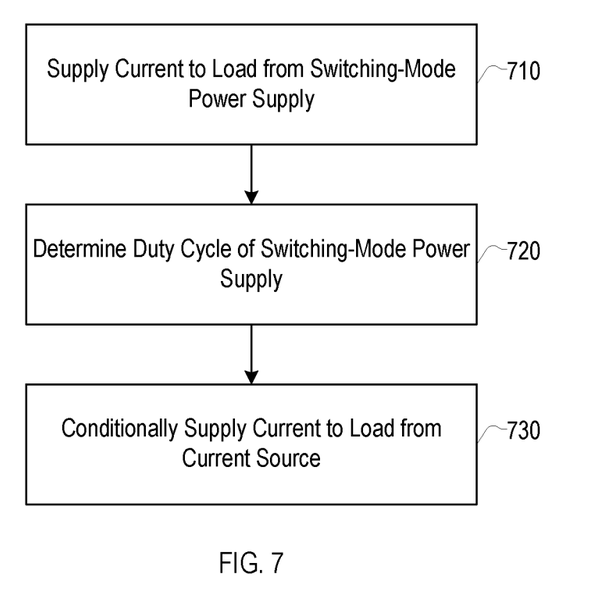
FIG. 7 is a flowchart of a process for supplying current to a load according to a presently disclosed embodiment.

FIG. 7 is a flowchart of a process for supplying current to a load according to a presently disclosed embodiment. The process will be described with reference to the power supplies described herein but may be used with any suitable apparatus.

In block 710, a switching-mode power supply supplies current to a load. For example, the switching-mode power supply 330 of the power supply 300 of FIG. 3 can supply current to its load.

In block 720, a duty cycle of an output stage of the switching-mode power supply is determined. For example, in the power supply 300 of FIG. 3, the control circuit 320 determines the duty cycle of the switch transistors 332.

In block 730, a helper current source supplies current to the load with the amount of current supplied by the current source based on the duty cycle determined in block 720. For example, in the power supply 300 of FIG. 3, the control circuit 320 can enable the helper current source 310 when the comparator 322 determines that the duty has exceeded a threshold. The control circuit 320 may additionally modify the duty cycle of the output stage of the switching-mode power supply when the helper current source is enabled or disabled.

The process of FIG. 7 may be modified by adding, omitting, reordering, or altering blocks. Additionally, blocks may be performed concurrently and a block that occurs after another block need not be immediately after.

Although particular embodiments are described above, many variations are possible. For example, the numbers of various components may be increased or decreased. Additionally, features of the various embodiments may be combined in combinations that differ from those described above.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application. In addition, the grouping of functions within a module or block is for ease of description. Specific functions can be moved from one module or block or distributed across to modules or blocks.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:
1. A power supply, comprising
a first switching-mode power supply configured to supply current to a first supply output and to output measurements of the current supplied by the first switching-mode power supply;

a second switching-mode power supply configured to supply current to a second supply output and to output measurements of the current supplied by the second switching-mode power supply;

a current source configurable to supply current to the first supply output or the second supply output; and a control circuit switchably connected to receive the measurements of the current supplied by the first switching-mode power supply and switchably connected to receive measurements of the current supplied by the second switching-mode power supply, the control circuit configured to control the current supplied by the current source based, in the case that the current source is configured to supply current to the first supply output, on the measurements of the current supplied by the first switching-mode power supply or based, in the case that the current source is configured to supply current to the second supply output, on the measurements of the current supplied by the second switching-mode power supply.

2. The power supply of claim 1, wherein the measurement of the current supplied by the first switching-mode power supply is based on a duty cycle of an output stage of the first switching-mode power supply.

3. The power supply of claim 2, wherein the control circuit is further configured to enable the current source based on the duty cycle of the output stage of the first switching-mode power supply exceeding a first threshold in the case that the current source is configured to supply current to the first supply output.

4. The power supply of claim 3, wherein the control circuit is further configured to disable the current source when the duty cycle of the output stage of the first switching-mode power supply falls below a second threshold in the case that the current source is configured to supply current to the first supply output.

5. The power supply of claim 3, wherein the first switching-mode power supply is further configured to decrease the duty cycle of the output stage of the first switching-mode power supply in the case that the control circuit enables the current source in the case that the current source is configured to supply current to the first supply output.

6. The power supply of claim 5, wherein the decrease in the duty cycle of the output stage of the first switching-mode power supply is based on an amount of current supplied by the current source.

7. The power supply of claim 1, wherein the first switching-mode power supply is further configured, in the case that the current source is configured to supply current to the first supply output, to adjust switching of an output stage of the first switching-mode power supply based on changes in the current supplied by the current source.

8. The power supply of claim 1, wherein the control circuit is further configured, in the case that the current source is configured to supply current to the first supply output, to control of the current supplied by the current source in proportion to the current supplied by the first switching-mode power supply.

9. A power supply, comprising:
a supply input;
a supply output;
a switching-mode power supply configured to supply current to the supply output;
a current source configured to supply current to the supply output from the supply input; and a control circuit configured to control the current supplied by the current source based on a duty cycle of an output stage of the switching-mode power supply,
wherein the switching-mode power supply is further configured to and adjust switching of an output stage of the switching-mode power supply based on changes in the current supplied by the current source.

10. The power supply of claim 9, wherein the control circuit is further configured to enable the current source in the case that the duty cycle of the output stage of the switching-mode power supply exceeds a first threshold.

11. The power supply of claim 10, wherein the control circuit is further configured to disable the current source in the case that the duty cycle of the output stage of the switching-mode power supply falls below a second threshold.

12. The power supply of claim 10, wherein the switching-mode power supply is further configured to decrease the duty cycle of the output stage of the switching-mode power supply in the case that the control circuit enables the current source.

13. The power supply of claim 12, wherein the decrease in the duty cycle of the output stage of the switching-mode power supply is based on the current supplied by the current source.

14. The power supply of claim 9, wherein the control circuit is further configured to control the current supplied by the current source in proportion to the duty cycle of the output stage of the switching-mode power supply.

15. A method for supplying current to a load, the method comprising:
supplying current from a switching-mode power supply to the load;
determining a duty cycle of the output stage of the switching-mode power supply;
supplying current from a current source to the load, wherein the current supplied by the current source is based on the determined duty cycle; and
adjusting switching of an output stage of the switching-mode power supply based on changes in the current supplied by the current source.

16. The method of claim 15, wherein supplying current from the current source includes enabling the current source in the case that the duty cycle of the output stage of the switching-mode power supply exceeds a first threshold.

17. The method of claim 16, wherein supplying current from the current source further includes disabling the current source in the case that the duty cycle of the output stage of the switching-mode power supply falls below a second threshold.

18. The method of claim 16, further comprising decreasing the duty cycle of the output stage of the switching-mode power supply in the case that the current source is enabled.

19. The method of claim 18, wherein the decrease in the duty cycle of the output stage of the switching-mode power supply is based on the current supplied by the current source.

20. The method of claim 15, wherein the current supplied by the current source is in proportion to the duty cycle of the output stage of the switching-mode power supply.

21. A power supply, comprising:
a switching-mode power supply for supplying current to a supply output from a supply input;
a current source for supplying current to the supply output from the supply input; and
a control means for controlling an amount of current supplied by the current source based on a duty cycle of an output stage of the switching-mode power supply, wherein the switching-mode power supply adjusts switching of an output stage of the switching-mode power supply based on changes in the current supplied by the current source.

22. The power supply of claim 21, wherein the control means is further for enabling the current source in the case that the duty cycle of the output stage of the switching-mode power supply exceeds a first threshold.

23. The power supply of claim 22, wherein the control means is further for disabling the current source in the case that the duty cycle of the output stage of the switching-mode power supply falls below a second threshold.

24. The power supply of claim 22, wherein the switching-mode power supply is further for decreasing the duty cycle of the output stage of the switching-mode power supply in the case that the control means enables the current source.

25. The power supply of claim 24, wherein the decrease in the duty cycle of the output stage of the switching-mode power supply is based on the amount of current supplied by the current source.

26. The power supply of claim 21, wherein the control means if further for controlling the amount of current supplied by the current source in proportion to the duty cycle of the output stage of the switching-mode power supply.

* * * * *